(12) United States Patent
Zhao et al.

(10) Patent No.: US 11,804,060 B1
(45) Date of Patent: Oct. 31, 2023

(54) SYSTEM FOR MULTI-MODAL ANOMALY DETECTION

(71) Applicant: AMAZON TECHNOLOGIES, INC., Seattle, WA (US)

(72) Inventors: Rui Zhao, Bellevue, WA (US); Manoj Aggarwal, Seattle, WA (US); Gerard Guy Medioni, Los Angeles, CA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/443,365

(22) Filed: Jul. 26, 2021

(51) Int. Cl.
*G06V 40/10* (2022.01)
*G06F 18/21* (2023.01)
*G06F 18/2415* (2023.01)
*G06V 40/14* (2022.01)

(52) U.S. Cl.
CPC ........ *G06V 40/107* (2022.01); *G06F 18/2193* (2023.01); *G06F 18/2415* (2023.01); *G06V 40/10* (2022.01); *G06V 40/117* (2022.01); *G06V 40/14* (2022.01)

(58) Field of Classification Search
CPC .... G06V 40/107; G06V 40/10; G06K 9/6265; G06K 9/6277
See application file for complete search history.

(56) References Cited

U.S. PATENT DOCUMENTS

| | | | | |
|---|---|---|---|---|
| 2014/0314283 | A1* | 10/2014 | Harding | G06V 40/70 |
| | | | | 382/115 |
| 2017/0039375 | A1* | 2/2017 | Centonze | H04L 63/20 |
| 2019/0228248 | A1* | 7/2019 | Han | G06V 10/82 |
| 2021/0042608 | A1* | 2/2021 | Sun | G06V 40/70 |
| 2021/0334350 | A1* | 10/2021 | Kim | G06F 21/32 |

OTHER PUBLICATIONS

Song, Lingxiao, Man Zhang, Xiang Wu, and Ran He. "Adversarial discriminative heterogeneous face recognition." In Proceedings of the AAAI conference on artificial intelligence, vol. 32, No. 1. 2018. (Year: 2018).*

Jiang, Fangling, Pengcheng Liu, Xiaohu Shao, and Xiangdong Zhou. "Face anti-spoofing with generated near-infrared images." Multimedia Tools and Applications 79, No. 29 (2020): 21299-21323. (Year: 2020).*

(Continued)

*Primary Examiner* — David Perlman
(74) *Attorney, Agent, or Firm* — Lindauer Law, PLLC (57) ABSTRACT

A pair of input images acquired using a first modality and a second modality is processed using a multi-classifier trained to determine classification data indicative of whether the pair is normal or abnormal. A pair may be deemed abnormal if one or both input images are obscured or inconsistent with one another. Training data comprising normal and abnormal images are used to train the multi-classifier. During training, the multi-classifier uses an objective function that includes cross entropy loss, distance loss, and discrepancy loss to process the training data. During use, the trained multi-classifier processes a pair of input images. If the resulting classification data indicates the pair of input images are normal, the pair of input images may be processed to assert an identity.

20 Claims, 4 Drawing Sheets

(56) References Cited

OTHER PUBLICATIONS

Shen, T., Huang, Y., & Tong, Z. (2019). FaceBagNet: Bag-of-local-features model for multi-modal face anti-spoofing. In Proceedings of the IEEE/CVF Conference on Computer Vision and Pattern Recognition Workshops (pp. 0-0). (Year: 2019).*

Ruff, et al., "Deep One-Class Classification", Proceedings of the 35th International Conference on Machine Learning, Stockholm, Sweden, PMLR 80, 2018, 10 pgs. Retrieved from the Internet: URL: http://proceedings.mlr.press/v80/ruff18a/ruff18a.pdf.

Ruff, et al., "Deep Semi-Supervised Anomaly Detection", arXiv.org, Published as a conference paper at ICLR 2020, 2020, 23 pgs. Retrieved from the Internet: URL: https://arxiv.org/pdf/1906.02694.pdf.

Wen, et al., "A Discriminative Feature Learning Approach for Deep Face Recognition", Springer International Publishing, ECCV 2016, Part VII, LNCS 9911, 2016, pp. 499-515. Retrieved from the Internet: URL: https://ydwen.github.io/papers/WenECCV16.pdf.

Yu, et al., "Unsupervised Out-of-Distribution Detection by Maximum Classifier Discrepancy", Abstract, Proceedings of the IEEE/CVF International Conference on Computer Vision (ICCV), 2019, pp. 9518-9526. Retrieved from the Internet: URL: http://openaccess.thecvf.com/content_ICCV_2019/html/Yu_Unsupervised_Out-of-Distribution_Detection_by_Maximum_Classifier_Discrepancy_ICCV_2019_paper.html.

* cited by examiner

SYSTEM FOR MULTI-MODAL ANOMALY DETECTION

BACKGROUND

Biometric input data may be used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using two or more modalities. For example, a first modality may comprise images of surface skin of a user's palm while a second modality may comprise images of subcutaneous features such as veins of the user's palm. The use of multi-modality input data provides several advantages for biometric identification. Multi-modalities provide information that may be useful is distinguishing one person from another. Use of multi-modalities may reveal a presentation attack using an artifact. For example, an artifact may comprise a simulated portion of a user, such as a silicone hand.

Described in this disclosure is a system for training and utilizing a multi-classifier module to classify multi-modal input data. For example, the classification may comprise classification data that indicates whether input image data is a first class associated with a "normal" image, or a second class associated with an "abnormal" image. Input image data that is determined to be associated with the first class, or "normal" class, may be further processed and used to determine identification data indicative of a particular user. Input image data that is determined to be associated with the second class, or "abnormal" class, may be discarded, flagged for additional study, and so forth.

Input data may be associated with a probability distribution. The class may be expressed with respect to this probability distribution. For example, input data that is within a threshold portion of the probability distribution, or "in distribution", may be classified as being associated with the first class, or "normal" class. In comparison, input data that is outside of the threshold portion of the probability distribution, or "out of distribution", may be classified as being associated with the second class, or "abnormal" class.

The multi-classifier module utilizes a plurality of classifiers. For example, the multi-classifier module may have two or more classifiers. The classifiers in multi-classifier module are trained using an objective function that includes cross entropy loss, distance loss, and discrepancy loss. This allows the multi-classifier module to provide substantially improved performance in classifying input data, such as an input image. For example, the multi-classifier module is highly effective at detecting abnormal input images, even if those abnormalities are novel and were not included in training data. For example, a variety of different materials and fabrication techniques may be used to create an artifact. By using the objective function described, the multi-classifier module is better able to determine input data is abnormal, even if a particular material and fabrication technique was not represented in the training data. For example, the multi-classifier module, once trained, may detect a fake hand that was not depicted in the training data.

The training data comprises images that are labeled according to the modality and class, such as normality. For example, the training data may comprise image data from actual hands and image data from artifacts, hands wearing gloves, and so forth. During training, the training data is provided to the multi-classifier module. During a given training iteration, an image and the associated label data is provided as input. For example, a normal image of a first modality may be processed during a first iteration. The first modality may be associated with one or more surface features corresponding to a human hand. Continuing the example, an abnormal image of a second modality may be processed during a second iteration. The second modality may be associated with one or more subcutaneous features corresponding to the human hand. Other combinations of inputs may also be used during training.

An embedding network is used to determine a first embedding vector for an image. The embedding vector is then processed by each of the classifier modules and an embedding vector distance module. The classifier modules provide as output probability values. These probability values are then used to calculate a cross entropy loss and the discrepancy loss. The probabilities include first, second, third, and fourth probability values. The first probability value is indicative of a first probability, as predicted by the first classifier, of the first embedding vector being associated with the modality indicated by the modality label, given the image being associated with the first class. The second probability value is indicative of a second probability, as predicted by the first classifier, of the first embedding vector being associated with the modality indicated by the modality label, given the image being associated with the second class. The third probability value is indicative of a third probability, as predicted by the second classifier, of the first embedding vector being associated with the modality indicated by the modality label, given the image being associated with the first class. The fourth probability value is indicative of a fourth probability, as predicted by the second classifier, of the first embedding vector being associated with the modality indicated by the modality label, given the image being associated with the second class.

The cross entropy loss is indicative of the cross entropy of the modality label asserted and the corresponding prediction. In one implementation, the cross entropy loss is based on a difference between the first probability value and the third probability value. As a result, the system during learning attempts to minimize the cross entropy loss. The discrepancy loss is based on the second probability value and the fourth probability value. For example, the discrepancy loss may be considered to be representative of the idea that a pair of real images, even of different modalities, will have some similarity to one another. As a result, during operation if the inputs are of an actual hand, a low discrepancy for a given modality will be observed. In comparison, if one of the inputs is not of an actual hand, a high discrepancy for the given modality will be observed.

The distance loss is indicative of a distance, in an embedding space, between the first embedding vector and an embedding vector reference parameter. For example, it would be expected that an actual hand in both modalities will be relatively close in the embedding space to the embedding vectors of other actual hands.

Once trained, the multi-classifier module is used to provide classification data that is indicative of whether input image data is normal or abnormal. If normal, the input image data may be processed to determine identification data. If abnormal, the input image data is not processed to determine identification data. Responsive to data indicating an abnormal input, other actions may be taken. For example, a notification may be presented, a user may be prompted to try scanning their hand again, scan a different hand, and so forth. In some implementations, abnormal data may still be stored for later analysis.

By using the techniques described in this disclosure, abnormal input data may be prevented from being processed to determine identification data. As a result, overall performance and security of the system to produce identification data is improved. For example, the system is better able to resist presentation attacks by detecting the use of an artifact.

Illustrative System

Figure 1:
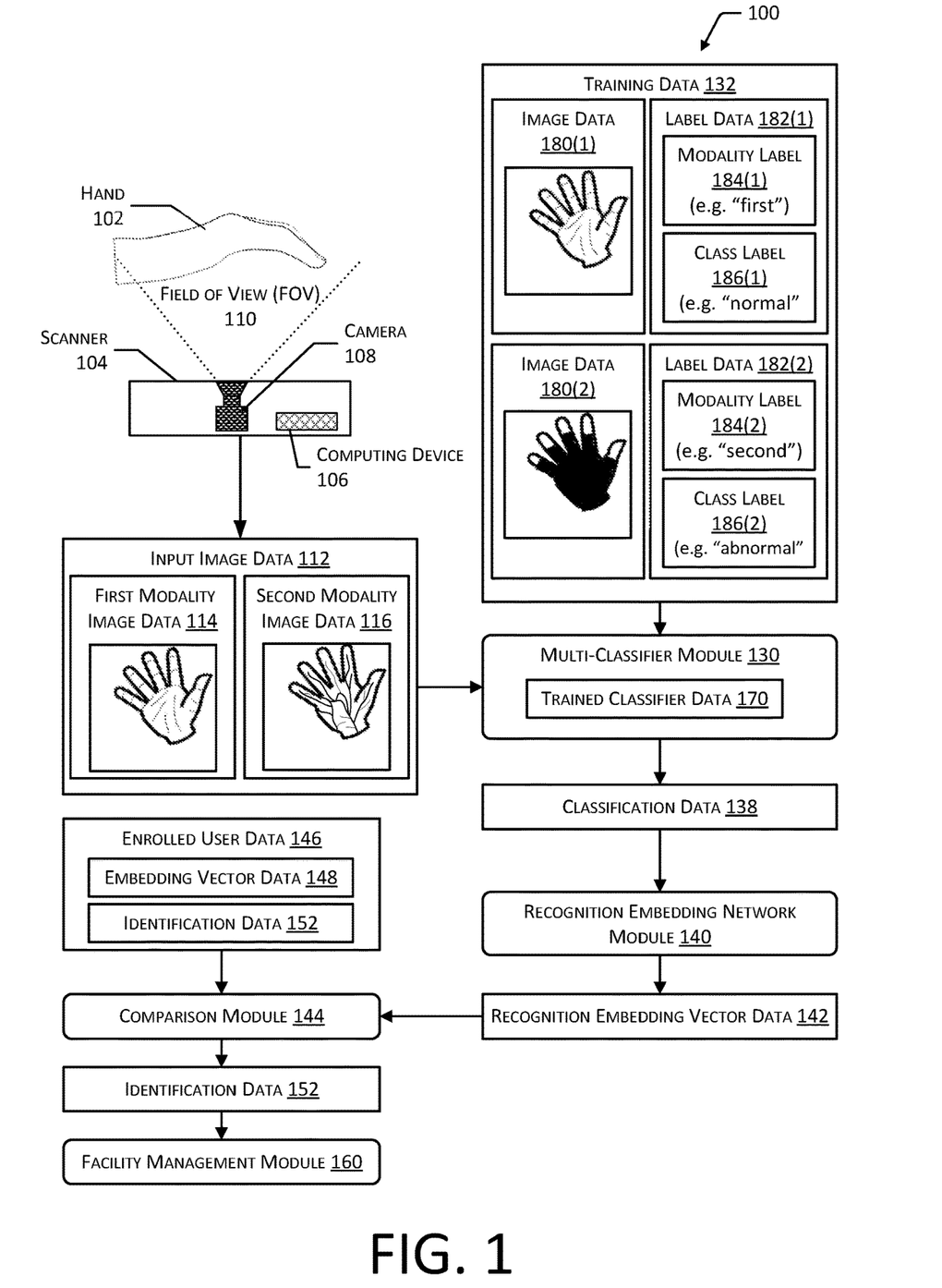
FIG. 1 illustrates a system to train and use a multi-classifier module to determine classification data about image data that may be used for biometric identification of a user, according to some implementations.

FIG. 1 illustrates a system 100 to train and use a multi-classifier module to determine classification data about input image data, according to some implementations. The system 100 is described as being used to facilitate the determination of an identity of a user. However, the multi-classifier module may be used in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 is too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary considerably due to changes in articulation, pose, distance, translation, and so forth. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the hand 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

The input image data 112 may comprise normal or abnormal image data. For example, normal image data may comprise the first modality image data 114 and the second modality image data 116 both being of the same actual hand 102. In comparison, abnormal image data may comprise images that depict an artifact. An artifact may comprise an object that is not an actual hand 102. For example, the artifact may comprise a sleeve that is obscuring part of the palm of the hand 102. In another example, the artifact may comprise a dressing over a portion of the hand 102 that is transparent in one modality and opaque in another modality. For example, the dressing may comprise a bandage, hydrocolloid film, and so forth. In yet another example, the artifact may comprise a fabricated model of a hand. In yet another example, the artifact may comprise a glove that is fabricated to present features of a first hand that is worn on a second hand.

The ability to determine a class of the input image and characterize the normality of the input image data 112 may be used to determine whether to discard or use input image data 112 for subsequent operations, such as identifying the user associated with the hand 102. For example, input image data 112 as being associated with the "abnormal" class may be discarded. This improves overall system performance by preventing the use of computing resources to process input image data 112 that is inadequate for use. The accuracy of identification is also improved by preventing abnormal input image data 112 from being processed.

To characterize input data, a multi-classifier module 130 is trained to provide as output classification data 138. In the implementation depicted here, the input data may comprise input image data 112 and the classification data 138 may be indicative of whether the input image data 112 is determined to be a first class that is associated with a normal image, or a second class that is associated with an abnormal image. In one implementation, the classification data 138 may comprise a single bit of data, indicating normal or abnormal. In other implementations, the classification data 138 may include information, such as an overall confidence value. While the classification data 138 is indicative of two classes, in other implementations two or more classes may be specified. For example, the classification data 138 may comprise the following three classes: "normal", "marginal", and "abnormal".

The multi-classifier module 130 comprises modules, including an embedding module, a plurality of classifier modules, and so forth. The multi-classifier module 130 is trained using training data 132. The multi-classifier module 130 during training is discussed in more detail with regard to FIG. 2. The training data 132 comprises image data 180. Label data 182 is associated with the image data 180. The label data 182 may comprise a modality label 184 and a class label 186. The modality label 184 is indicative of the modality "y" that is associated with the image data 180. The image data 180 in the training data 132 may be acquired using a plurality of different modalities. The class label 186 is indicative of the class "x" that is associated with the image data 180. For example, the class label 186 may indicate that the image data 180 is associated with a first class or a second class. Continuing the example, the first class may be associated with a normal image, while the second class is associated with an abnormal image.

The training data 132 may thus comprise various combinations of images with different modalities and classes. For example, the training data 132 may contain images of a normal hand acquired using a first modality, a normal hand acquired using a second modality, an abnormal hand acquired using the first modality, an abnormal hand acquired using the second modality, and so forth.

In some implementations, the training data 132 may comprise synthetic data. For example, synthetic normal image data 180 and synthetic abnormal image data 180 may be generated by a neural network or other system.

During training, the multi-classifier module 130 processes at least a portion of the training data 132 to determine trained classifier data 170. The trained classifier data 170 may comprise one or more values that are associated with individual nodes within one or more of feature layers, classification layers, or other layers of the multi-classifier module 130. For example, the trained classifier data 170 may comprise information indicative of relative weights to be assigned to specific nodes within classifiers. The output from the multi-classifier module 130 is the classification data 138.

During training, the multi-classifier module 130 receives and processes the training data 132. An objective function that includes cross entropy loss, distance loss, and discrepancy loss is used to process the training data 132 during training. These loss values are then provided back to the nodes in the plurality of classifiers of the multi-classifier module 130 to train the nodes for subsequent processing of the next training data 132. In some implementations, the loss values may also be used to train nodes in the embedding module, to determine an embedding vector reference parameter, and so forth. After a plurality of iterations, the modification of the weights, bias values, and so forth of the nodes results in the trained classifier data 170. Training is discussed in more detail with regard to FIG. 2.

The recognition embedding network module 140 may comprise a deep learning system, such as a convolutional neural network. The recognition embedding network module 140 may include a plurality of layers. These layers may include convolutional layers, pooling layers, and so forth. The input image data 112 may be provided as input and used to determine recognition embedding vector data 142. The recognition embedding vector data 142 comprises information that is representative of the features presented in the processed image data.

During an enrollment process, the user may opt in to use the system 100 and presents their hand 102 to produce input image data 112. Enrolled user data 146 may be stored that comprises one or more of the processed image data, associated recognition embedding vector data 142, name, and additional information. For example, the additional information may comprise name, contact information, demographic data, payment account information, and so forth. The recognition embedding vector data 142 may act as a "signature" that is uniquely associated with the identity of the user. During the enrollment process, the multi-classifier module 130 may be used to determine that the input image data 112 is within an approved class. For example, the enrollment process may only proceed if the input image data 112 comprises images that have classification data 138 indicative of a first class or "normal" class of image. This prevents enrollment from proceeding in situations such as a user wearing a glove. During the enrollment process, after the classification data 138 has been checked, a comparison module 144 may be used to determine whether the user has been previously enrolled.

During subsequent usage, the (as yet unidentified) user presents their hand 102 at a scanner 104. The resulting input image data 112 may be processed by at least a portion of the recognition embedding network module 140 to determine first recognition embedding vector data 142. The comparison module 144 compares the first recognition embedding vector data 142 to the recognition embedding vector data 142 stored in the enrolled user data 146 to determine identification data 152. In one implementation, the identification data 152 may comprise a user identifier associated with the closest previously stored embedding vector data 148 in the enrolled user data 146 to the recognition embedding vector data 142 associated with the user who presented their hand 102.

The identification data 152 may provide information such as one or more of a user identifier associated with the user, a location or identification of the scanner 104, data indicative of date and time that the input image data 112 was obtained, and so forth. The identification data 152 may be subsequently used for various purposes. For example, if the user has been granted access to the facility, a command may be issued to open a gate or door so the user may enter the facility. In another example, the identification data 152 may be used to determine a payment account or other credentials associated with the user which may then be used in a financial transaction. In yet another example, the identification data 152 may be passed to a facility management module 160.

The facility management module 160 may use the identification data 152 to associate an identity with that user as they move about the facility. For example, the facility management module 160 may use data from cameras or other sensors in the environment to determine a location of the user. Given a known path of the user from the gate, the user identity indicated in the identification data 152 may be associated with the user as they use the facility. For example, the now identified user may walk to a shelf, remove an item, and leave the facility. The facility management module 160 may determine the interaction data indicative of the removal of the item as being associated with the user identifier specified in the identification data 152, and bill an account associated with the user identifier.

The systems and techniques described above are discussed with respect to images of human hands. These systems and techniques may be used with respect to other forms of data, other kinds of objects, and so forth.

Figure 2:
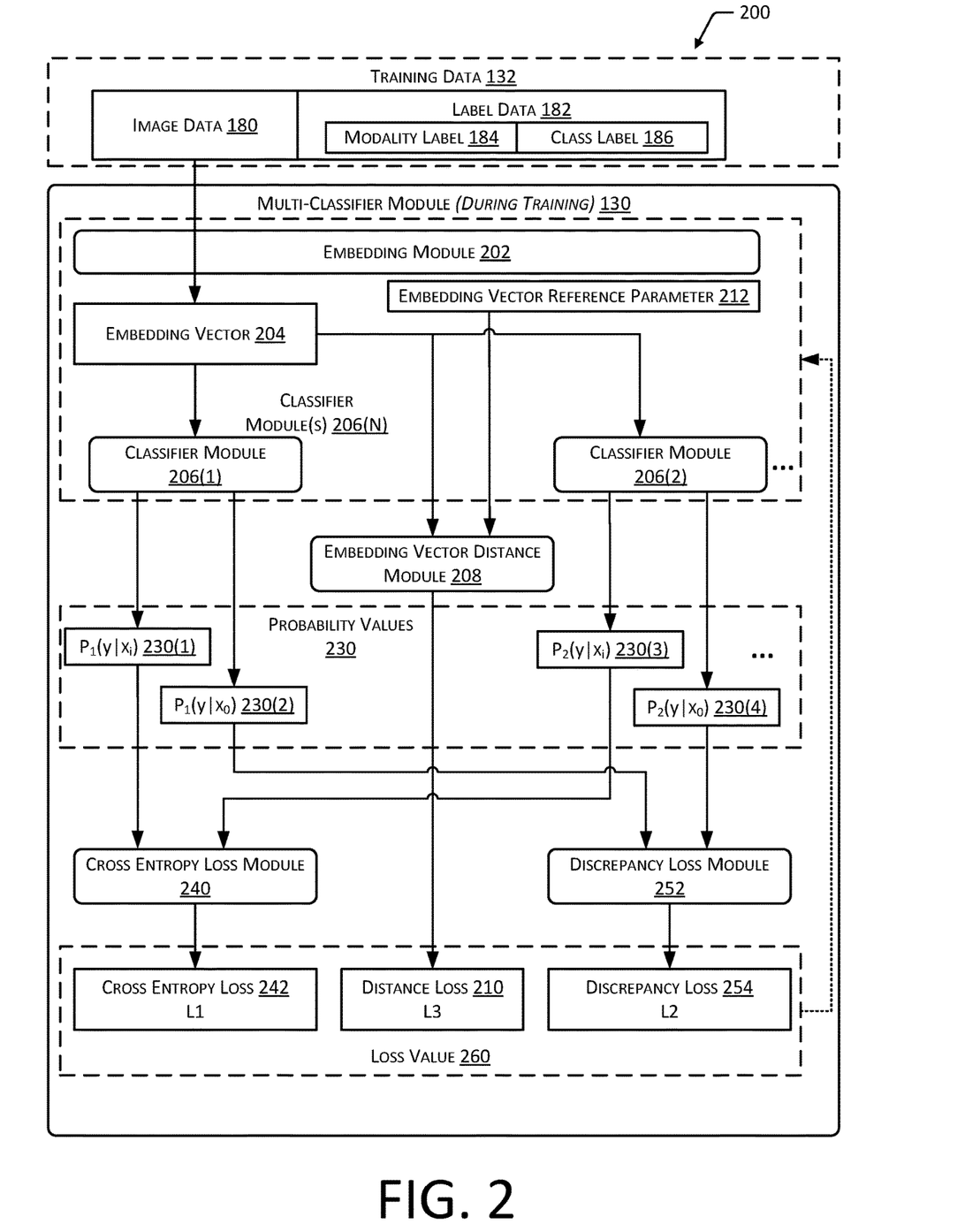
FIG. 2 illustrates a multi-classifier module during training, according to some implementations.

FIG. 2 illustrates at 200 a multi-classifier module 130 during training, according to some implementations. The multi-classifier module 130 may be implemented by one or more computing devices. The training data 132 comprises a set of image data 180 with associated label data 182. During training, the training data 132 comprising image data 180 is provided as input, with each input associated with label data 182. The label data 182 comprises a modality label 184 "y" and a class label 186 "x". The modality label 184 indicates that the image data 180 is associated with a first modality, second modality, and so forth. For example, the image data 180(1) may be acquired using modality y=1 and depict a class of "normal" $x_i$. In another example, the image data 180(2) may be acquired using modality y=2 and depict a class of "abnormal" $x_0$. Two classes are discussed by way of illustration, and not necessarily as a limitation. In other implementations three or more classes may be specified.

An embedding module 202 processes the image data 180 to determine embedding vector 204 for the image data 180. In some implementations the embedding module 202 may comprise a neural network that has previously been trained to produce embedding vectors 204 representative of one or more features depicted in the image data 180. The image data 180 is processed to determine a first embedding vector 204(1). In the implementation shown, a single embedding module 202 is used. In other implementations a plurality of embedding modules 202(1)-(G) may be used. For example, a different embedding module 202 may be used to process training data 132 that is associated with a particular modality label 184. In some implementations the embedding module 202 may be trained based at least in part on loss value(s) 260. For example, the embedding module 202 may be trained to provide embedding vector(s) 204. This training may result in an embedding vector 204 that facilitates improved detection of an anomaly between the different modalities.

The multi-classifier module 130 comprises a plurality of classifier modules 206(1)-(N). In the implementation shown, the multi-classifier module 130 includes a first classifier module 206(1) and a second classifier module 206(2). In other implementations, additional classifier modules 206(3)-(N) may be used. Each classifier module 206 implements a classification algorithm. For example, each classifier module 206 may comprise a neural network comprising a plurality of nodes. Each node may have one or more relative weights that may be determined at least in part during training. In some implementations, the classification algorithms and the classifier modules 206 may differ from one another. In an implementation in which the same classification algorithm is used for the classifier modules 206, different initial states may be used. As a result, the trained classifier data 170 for different classifier modules 206, even if implementing the same algorithm, may differ.

Each classifier module 206 accepts as input the embedding vectors 204 and determines one or more probability values 230. In this implementation, each classifier module 206 provides as output two probability values 230. The first classifier module 206(1) produces a first probability value 230(1) and a second probability value 230(2). The second classifier module 206(2) produces a third probability value 230(3) and a fourth probability value 230(4).

The first probability value 230(1) is indicative of a probability, as predicted by the first classifier module 206(1), of the first embedding vector 204(1) being associated with the first modality y=1, given the image data 180 being associated with the first class $x_i$. The second probability value 230(2) is indicative of a probability, as predicted by the first classifier module 206(1), of the first embedding vector 204(1) being associated with the first modality y=1, given the image data 180 being associated with the second class $x_0$. The third probability value 230(3) is indicative of a probability, as predicted by the second classifier module 206(2), of the first embedding vector 204(1) being associated with the second modality y=2, given the image data 180 being associated with the first class $x_i$. The fourth probability value 230(4) is indicative of a probability, as predicted by the second classifier module 206(2), of the first embedding vector 204(1) being associated with the second modality y=2, given the image data 180 being associated with the second class $x_0$. Stated in another form:

The first probability value 230(1) as $P_1(y|x_i)$ (Equation 1)

The second probability value 230(2) as $P_1(y|x_0)$ (Equation 2)

The third probability value 230(3) as $P_2(y|x_i)$ (Equation 3)

The fourth probability value 230(4) as $P_2(y|x_0)$ (Equation 4)

A cross entropy loss module 240 determines a cross entropy loss 242 based on the first probability value 230(1) and the third probability value 230(3). The cross entropy loss module 240 "L1" may be calculated using the following equation:

$$L1 = -\text{avg}(\log(P_1(y|x_i))) - \text{avg}(\log(P_2(y|x_i)))$$ (Equation 5)

The multi-classifier module 130 may include a discrepancy loss module 252. The discrepancy loss module 252 determines a discrepancy loss 254 based on the second probability value 230(2) and the fourth probability value 230(4). The discrepancy loss 254 "L2" may be calculated using the following equations:

$$L2 = \max(m - \text{avg}(d(P_1(y|x_0), P_2(y|x_0))), 0)$$ (Equation 6)

$$d(P_1(y|x_0), P_2(y|x_0)) = H(P_1(y|x_0)) - H(P_2(y|x_0))$$ (Equation 7)

is the margin m of discrepancy between the two classifier modules 206; and

H is the Shannon entropy.

The maximum discrepancy is ln(C) where C is the total number of modalities such as surface and subcutaneous. For example, if two modalities are specified, then C=ln(2). During training, the classifier modules 206 are then trained to minimize the cross-entropy loss 242 on images labeled with the first class, while maximizing discrepancy loss 254 for images labeled with the second class.

To improve separation between the classes of inputs, an embedding vector distance module 208 determines a distance loss 210. The distance loss 210 also allows the classifier modules 206 to provide an improved response in processing previously untrained situations. For example, system performance is improved in the event an image contains a novel or previously untrained abnormality. The embedding vector distance module 208 accepts as input the embedding vectors 204(1). The distance loss 210 may be calculated using the following equation:

$$L3 = \text{avg}(\|e(x)-c\|\hat{} \text{sign}(x))$$ (Equation 8)

where e(x) is the feature embedding vector 204 associated with x, c is an embedding vector reference parameter 212 that is initialized based on a training vector, and sign(x)=1 if the class label 186 indicates the first class or −1 if the class label 186 indicates the second class.

During training, the cross entropy loss 242, distance loss 210, and the discrepancy loss 254 are used to determine the loss value 260 "L". The loss value 260 may be used to train one or more of the classifier modules 206, the embedding module 202, and so forth. The loss value 260 may also be used to determine the embedding vector reference parameter 212. In one implementation, the overall objective function used by the multi-classifier module 130 during training may be expressed as:

$$L = L1 + a*L2 + b*L3$$ (Equation 9)

where a and b are coefficients.

In another implementation (not shown) the multi-classifier module 130 may determine the values of L1, L2, and L3 that correspond to the respective input image data 112. During training the classifier module 206 is optimized by minimizing an inter-modality loss as calculated by an inter-modality classifier module. The inter-modality classifier module may access as input embedding vectors 204 that are associated with a first modality image data 114 and a second modality image data 116. The embedding vectors 204 provided as input may be concatenated. The inter-modality loss "L4" may be calculated using the following equation:

$$L4 = -\text{avg}(\log(p\_m(y|e(x\_p), e(x\_v))))$$ (Equation 10)

where p_m(y|e(x_p), e(x_v)) is the probability of the pair of input images possessing sufficient change.

During operation, the cross entropy loss 242, distance loss 210, the discrepancy loss 254, and inter-modality loss are used to determine the loss value 260 "L". In one implementation, the overall objective function used by the multi-classifier module 130 during training may be expressed as:

$$L = L1 + a*L2 + b*L3 + c*L4$$ (Equation 11)

where a,b,c are coefficients.

Figure 3:
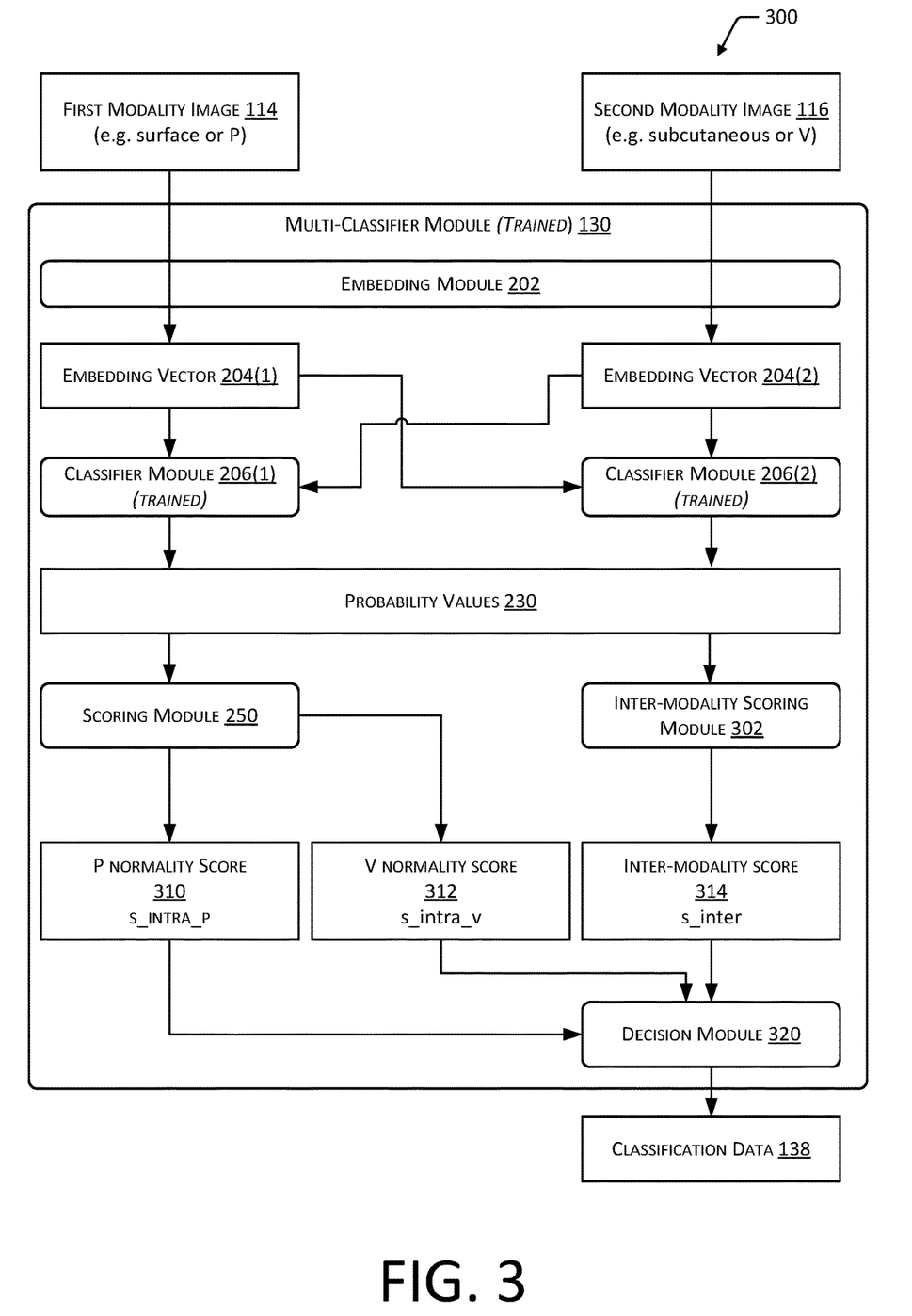
FIG. 3 illustrates a trained multi-classifier module during inference, according to some implementations.

FIG. 3 illustrates at 300 the trained multi-classifier module 130 during inference, according to some implementations. The multi-classifier module 130 may be implemented by one or more computing devices. During inference, a plurality of input data is provided to the multi-classifier module 130 that has been trained as described with regard to FIG. 2. In this illustration, the input data is a pair of images, one for each modality. In other implementations, three or more modalities may be accommodated.

The first modality image 114, such as depicting surface features of a hand 102, is provided as input. Based on the first modality image 114, the embedding module 202 determines the first embedding vector 204(1). The second modality image 116, such as depicting subcutaneous features of the hand 102, is provided as input. In some implementations the first modality image 114 and the second modality image 116 may be obtained at the same time, during an overlapping time, or at different times. Based on the second modality image 116, the embedding module 202 determines second embedding vector 204(2).

The first classifier module 206(1) uses as input the first embedding vector 204(1) and the second embedding vector 204(2) and determines probability values 230 such as the first probability value 230(1) and the second probability value 230(2). The second classifier module 206(2) uses as input the first embedding vector 204(1) and the second embedding vector 204(2) and determines further probability values 230 such as the third probability value 230(3) and the fourth probability value 230(4).

A scoring module 250 uses as input one or more of the probability values 230 and determines a P normality score 310 "s_intra_p" and a V normality score 312 "s_intra_v". The scoring module 250 may utilize the equations described with respect to the cross entropy loss module 240, the discrepancy loss module 252. For example, the discrepancy for the first modality image 114 as described in the discrepancy loss module 252 may be used as the surface P normality score 310 "s_intra_p". Continuing the example, the discrepancy for the second modality image 116 as described in the discrepancy loss module 252 may be used as a subcutaneous V normality score 312 "s_intra_v". Intra-modality scores include the P normality score 310 and the V normality score 312 that are representative of the normality of the respective modality.

An inter-modality scoring module 302 uses as input one or more of the probability values 230 to determine an inter-modality score 314 "s_inter". The inter-modality score 314 is representative as to whether the modalities of the input are distinguishable or not. The inter-modality scoring module 302 may use the following equation:

$$s\_inter = 0.5 * \text{sum}\_\{i=p \text{ or } v\} w*(p1(y\_i|x\_i) + p2(y\_i|x\_i)) \quad \text{(Equation 12)}$$

where w is a constant, such as 0.5 in one implementation.

The P normality score 310, V normality score 312, and the inter-modality score 314 are provided as input to a decision module 320. The decision module 320 may compare each of the inputs to a respective threshold value. In one implementation, the decision module 320 may implement an "OR" type function, in which if any of the scores exceeds a respective threshold value, the classification data 138 is indicative of an abnormal input. In this implementation, the P normality score 310 is compared to a first threshold. If the P normality score 310 is greater than the first threshold, abnormal input is determined to have been presented. Likewise in this implementation, the V normality score 312 is compared to a second threshold. If the V normality score 312 is greater than the second threshold, abnormal input is determined to have been presented. Further in this implementation, the inter-modality score 314 is compared to a third threshold. If the inter-modality score 314 is greater than the third threshold, abnormal input is determined to have been presented.

In other implementations, the decision module 320 may implement other techniques. For example, if a majority of the inputs exceed their respective thresholds, the decision module 320 may indicate abnormal input has been presented.

Figure 4:
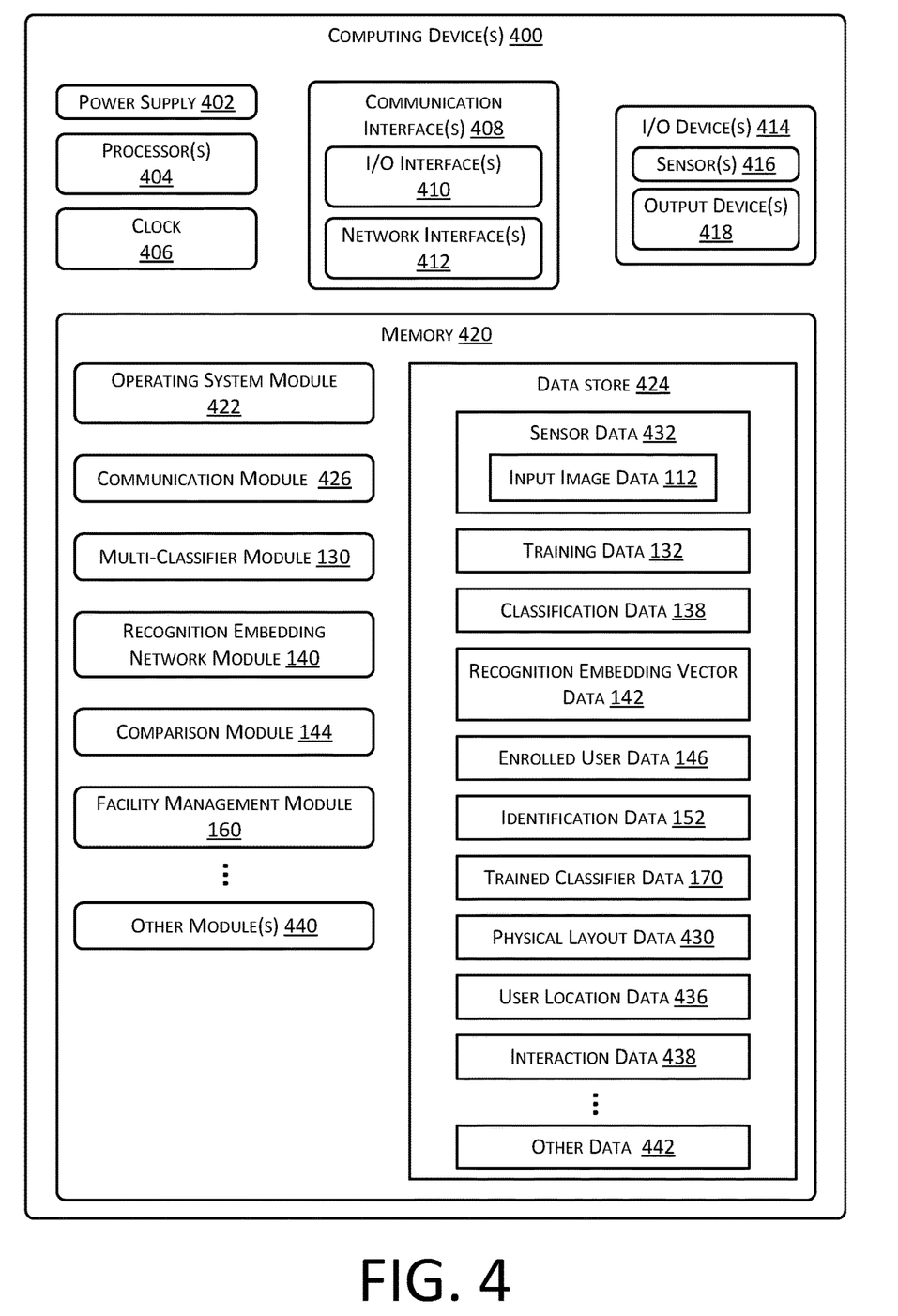
FIG. 4 is a block diagram of a computing device to implement the system, according to some implementations.

FIG. 4 is a block diagram of a computing device 400 to implement the system 100, according to some implementations. The computing device 400 may be within the scanner 104, may comprise a server, and so forth. The computing device 400 may be physically present at the facility, may be accessible by a network, or a combination of both. The computing device 400 does not require end-user knowledge of the physical location and configuration of the system that delivers the services. Common expressions associated with the computing device 400 may include "embedded system", "on-demand computing", "software as a service (SaaS)", "platform computing", "network-accessible platform", "cloud services", "data centers", and so forth. Services provided by the computing device 400 may be distributed across one or more physical or virtual devices.

One or more power supplies 402 may be configured to provide electrical power suitable for operating the components in the computing device 400. The one or more power supplies 402 may comprise batteries, capacitors, fuel cells, photovoltaic cells, wireless power receivers, conductive couplings suitable for attachment to a power source such as provided by an electric utility, and so forth. The computing device 400 may include one or more hardware processors 404 (processors) configured to execute one or more stored instructions. The processors 404 may comprise one or more cores. One or more clocks 406 may provide information indicative of date, time, ticks, and so forth. For example, the processor 404 may use data from the clock 406 to associate a particular interaction with a particular point in time.

The computing device 400 may include one or more communication interfaces 408 such as input/output (I/O) interfaces 410, network interfaces 412, and so forth. The communication interfaces 408 enable the computing device 400, or components thereof, to communicate with other devices or components. The communication interfaces 408 may include one or more I/O interfaces 410. The I/O interfaces 410 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include input devices such as one or more of a sensor 416, keyboard, mouse, scanner, and so forth. The I/O devices 414 may also include output devices 418 such as one or more of a display device, printer, audio speakers, and so forth. In some embodiments, the I/O devices 414 may be physically incorporated with the computing device 400 or may be externally placed. The sensors 416 may comprise the camera 108, smartcard readers, touch sensors, microphones, and so forth.

The network interfaces 412 may be configured to provide communications between the computing device 400 and other devices, such as routers, access points, and so forth. The network interfaces 412 may include devices configured to couple to personal area networks (PANs), local area networks (LANs), wireless local area networks (WLANS), wide area networks (WANs), and so forth. For example, the network interfaces 412 may include devices compatible with Ethernet, Wi-Fi, Bluetooth, and so forth.

The computing device 400 may also include one or more buses or other internal communications hardware or software that allow for the transfer of data between the various modules and components of the computing device 400.

As shown in FIG. 4, the computing device 400 includes one or more memories 420. The memory 420 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 420 provides storage of computer-readable instructions, data structures, program modules, and other data for the operation of the computing device 400. A few example functional modules are shown stored in the memory 420, although the same functionality may alternatively be implemented in hardware, firmware, or as a system on a chip (SoC).

The memory 420 may include at least one operating system (OS) module 422. The OS module 422 is configured to manage hardware resource devices such as the I/O interfaces 410, the I/O devices 414, the communication interfaces 408, and provide various services to applications or modules executing on the processors 404. The OS module 422 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

A communication module 426 may be configured to establish communications with the computing device 106, servers, other computing devices 400, or other devices. The communications may be authenticated, encrypted, and so forth.

Also stored in the memory 420 may be a data store 424 and one or more of the following modules. These modules may be executed as foreground applications, background tasks, daemons, and so forth. The data store 424 may use a flat file, database, linked list, tree, executable code, script, or other data structure to store information. In some implementations, the data store 424 or a portion of the data store 424 may be distributed across one or more other devices including the computing devices 400, network attached storage devices, and so forth.

The data store 424 may store one or more of the input image data 112, the training data 132, the trained classifier data 170, enrolled user data 146, the recognition embedding vector data 142, asserted identification data 152, and so forth. The memory 420 may store the multi-classifier module 130, the recognition embedding network module 140, the comparison module 144, the facility management module 160, and so forth.

The facility management module 160 may perform various functions, such as tracking items between different inventory locations, to and from carts, generating restocking orders, directing operation of robots within the facility, using the (asserted) identification data 152 to associate a particular user identity with a user in the facility, and so forth. During operation, the facility management module 160 may access sensor data 432 such as input image data 112, or data from other sensors.

Information used by the facility management module 160 may be stored in the data store 424. For example, the data store 424 may be used to store physical layout data 430, sensor data 432, (asserted) identification data 152, user location data 436, interaction data 438, and so forth. For example, the sensor data 432 may comprise the input image data 112 obtained from a scanner 104 associated with the facility.

The physical layout data 430 may provide information indicative of where scanners 104, cameras, weight sensors, antennas for radio receivers, inventory locations, and so forth are in the facility with respect to one another. For example, the physical layout data 430 may comprise information representative of a map or floor plan of the facility with relative positions of gates with scanners 104 and inventory locations.

The facility management module 160 may generate the user location data 436 that is indicative of the location of the user within the facility. For example, the facility management module 160 may use image data obtained by the cameras to determine a location of the user. In other implementations, other techniques may be used for determining the user location data 436. For example, data from a smart floor may be used to determine the location of the user.

Identification data 152 may be associated with user location data 436. For example, the user enters the facility and has their hand 102 scanned by the scanner 104, resulting in (asserted) identification data 152 that is indicative of their time of entry and the scanner 104 associated with where they entered. The user location data 436 indicative of a path of a user that begins at the scanner 104 at the time of entry may be associated with the user identifier in the (asserted) identification data 152.

Based on the user location data 436 and the interaction data 438, a particular interaction may be associated with an account of a particular user. For example, if the user location data 436 indicates that the user is present in front of inventory location 492 at time 17:47:20 and the interaction data 438 indicates a pick of a quantity of one item from an area on inventory location 492 at 17:47:27, the user may be billed for that pick.

The facility management module 160 may use the sensor data 432 to generate the interaction data 438. The interaction data 438 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 160 may generate interaction data 438 that indicates what item the user picked from a particular lane on a shelf, and then use this interaction data 438 to adjust the count of inventory stowed at that lane. The interaction data 438 may then be used to bill an account associated with the user identifier that is associated with the user who picked the item.

The facility management module 160 may process the sensor data 432 and generate output data. For example, based on the interaction data 438, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 440 may also be present in the memory 420 as well as other data 442 in the data store 424. For example, a billing module may use the interaction data 438 and the (asserted) identification data 152 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the (asserted) identification data 152. In another example, a robot may incorporate a scanner 104. The robot may use the (asserted) identification data 152 to determine whether to deliver a parcel to the user, and based on the (asserted) identification data 152, which parcel to deliver.

While the input to the multi-classifier module 130 is discussed with respect to image data 180, the multi-classifier module 130 may be used with other types of input. For example, the input may comprise data acquired from one or more sensors, data generated by another system, and so forth. For example, instead of image data produced by a camera 108, the input to the multi-classifier module 130 may comprise an array of data. Other modalities may also be used. For example, the first modality may be visible light, the second modality may be sonar, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a memory storing first computer-executable instructions; and
   a hardware processor to execute the first computer-executable instructions to:
   determine a first set of training data, the first set comprising:
   a plurality of images, wherein each image of the plurality of images is associated with first label data, the first label data comprising:
   a modality label that indicates a modality associated with the image of the plurality of images, and
   a class label that indicates a class associated with the image, wherein the class is representative of:
   a first class that is indicative of a normal image, or
   a second class that is indicative of an abnormal image;
   determine, using a first embedding module, a first embedding vector based on the image;
   determine a distance loss based on the first embedding vector and an embedding vector reference parameter;
   determine, using a first classifier to process the first embedding vector, a first probability value and a second probability value;
   determine, using a second classifier to process the first embedding vector, a third probability value and a fourth probability value;
   determine a cross entropy loss based on the first probability value and the third probability value;
   determine a discrepancy loss based on the second probability value and the fourth probability value; and
   train the first classifier and the second classifier based on the distance loss, the cross entropy loss, and the discrepancy loss.

2. The system of claim 1, wherein:
   the first probability value is indicative of a first probability, as predicted by the first classifier, of the first embedding vector being associated with the modality indicated by the modality label, given the image being associated with the first class;
   the second probability value is indicative of a second probability, as predicted by the first classifier, of the first embedding vector being associated with the modality indicated by the modality label, given the image being associated with the second class;
   the third probability value is indicative of a third probability, as predicted by the second classifier, of the first embedding vector being associated with the modality indicated by the modality label, given the image being associated with the first class; and
   the fourth probability value is indicative of a fourth probability, as predicted by the second classifier, of the first embedding vector being associated with the modality indicated by the modality label, given the image being associated with the second class.

3. The system of claim 2, wherein the first computer-executable instructions to determine the cross entropy loss include:

$$\text{average}(\log(\text{first probability value})-\text{average}(\log(\text{third probability value}))).$$

4. The system of claim 2, wherein the first computer-executable instructions to determine the discrepancy loss include:

$$\text{maximum}(m-\text{average}(d(\text{second probability value}, \text{fourth probability value})),0),$$

where $m$ is a margin of discrepancy, and
$d$(second probability value, fourth probability value) equals $H$(second probability value)−$H$(fourth probability value), where H is a Shannon entropy.

5. The system of claim 1, wherein the first computer-executable instructions to determine the distance loss include:

average($\|e(x)-c\|^{sign(x)}$), where x is the first embedding vector and sign(x) is: 1 if the class label of the image is indicative of the first class, or −1 if the class label of the image is indicative of the second class, and c is an embedding vector reference parameter having a same dimension as the first embedding vector.

6. The system of claim 1, wherein the modality label is indicative of one of:
   a first modality associated with one or more surface features of a human palm, or
   a second modality associated with one or more subcutaneous features of the human palm.

7. The system of claim 1, wherein the abnormal image is representative of one or more of:
   a portion of an image that is obscured, or
   an artifact simulating a human hand or a portion thereof.

8. A method comprising:
   accessing a first set of training data comprising:
      an image,
      a modality label that indicates a modality of the image, and
      a class label that indicates a class associated with the image;
   determining a first embedding vector of the image;
   determining a distance loss based on the first embedding vector;
   determining, using a first classifier to process the first embedding vector, a first probability value and a second probability value;
   determining, using a second classifier to process the first embedding vector, a third probability value and a fourth probability value;
   determining a cross entropy loss based on the first probability value and the third probability value;
   determining a discrepancy loss based on the second probability value and the fourth probability value; and
   determining one or more values associated with operation of the first classifier and the second classifier based on the distance loss, the cross entropy loss, and the discrepancy loss.

9. The method of claim 8, wherein:
   the first probability value is indicative of a first probability, as predicted by the first classifier, of the first embedding vector being associated with the modality indicated by the modality label, given the image being associated with a first class;
   the second probability value is indicative of a second probability, as predicted by the first classifier, of the first embedding vector being associated with the modality indicated by the modality label, given the image being associated with a second class;
   the third probability value is indicative of a third probability, as predicted by the second classifier, of the first embedding vector being associated with the modality indicated by the modality label, given the image being associated with the first class; and
   the fourth probability value is indicative of a fourth probability, as predicted by the second classifier, of the first embedding vector being associated with the modality indicated by the modality label, given the image being associated with the second class.

10. The method of claim 8, wherein the determining the cross entropy loss comprises calculating:

average(log(first probability value)−average(log(third probability value))).

11. The method of claim 8, wherein the determining the discrepancy loss comprises calculating:

maximum($m$−average($d$(second probability value, fourth probability value)),0), where m is a margin of discrepancy, and
$d$(second probability value, fourth probability value) equals $H$(second probability value)−$H$(fourth probability value), where H is a Shannon entropy.

12. The method of claim 8, wherein the determining the distance loss comprises calculating:

average($\|e(x)-c\|^{sign(x)}$), where x is the first embedding vector and sign(x) is: 1 if the class label of the image is indicative of a first class, or −1 if the class label of the image is indicative of a second class, and c is an embedding vector reference parameter having a same dimension as the first embedding vector.

13. The method of claim 8, wherein the modality label is indicative of one of:
   a first modality associated with one or more surface features corresponding to a human hand, or
   a second modality associated with one or more subcutaneous features corresponding to the human hand.

14. The method of claim 8, wherein the class associated with the image is representative of one or more of:
   a portion of the image that is obscured, or
   an artifact simulating at least a portion of a human.

15. A system comprising:
   a memory, storing first computer-executable instructions; and
   a hardware processor to execute the first computer-executable instructions to:
      receive a first modality image and a second modality image;
      determine a first set of training data, the first set comprising:
         an image,
         a modality label that indicates a modality of the image, and
         a class label that indicates a class associated with the image;
      determine, using a first embedding module, a first embedding vector based on the image;
      determine one or more losses based at least on one or more of:
         the first embedding vector,
         a first classifier processing on the first embedding vector, or
         a second classifier processing on the first embedding vector;
      train the first classifier and the second classifier based on the one or more losses; and
      determine, based on the first modality image and the second modality image, identification data.

16. The system of claim 15, the hardware processor to further execute the first computer-executable instructions to:
   determine a distance loss based on the first embedding vector;

determine, using the first classifier processing on the first embedding vector, a first probability value and a second probability value;

determine, using the second classifier processing on the first embedding vector, a third probability value and a fourth probability value;

determine a cross entropy loss based on the first probability value and the third probability value; and determine a discrepancy loss based on the second probability value and the fourth probability value.

17. The system of claim 16, wherein:

the first probability value is indicative of a first probability, as predicted by the first classifier, of the first embedding vector being associated with the modality indicated by the modality label, given the image being associated with a first class;

the second probability value is indicative of a second probability, as predicted by the first classifier, of the first embedding vector being associated with the modality indicated by the modality label, given the image being associated with a second class;

the third probability value is indicative of a third probability, as predicted by the second classifier, of the first embedding vector being associated with the modality indicated by the modality label, given the image being associated with the first class; and the fourth probability value is indicative of a fourth probability, as predicted by the second classifier, of the first embedding vector being associated with the modality indicated by the modality label, given the image being associated with the second class.

18. The system of claim 17, wherein the first computer-executable instructions to determine the cross entropy loss include calculating:

$$\text{average}(\log(\text{first probability value})) - \text{average}(\log(\text{third probability value})).$$

19. The system of claim 17, wherein the first computer-executable instructions to determine the discrepancy loss include calculating:

$$\text{maximum}(m - \text{average}(d(\text{second probability value}, \text{fourth probability value})), 0),$$

where m is a margin of discrepancy, and
d(second probability value, fourth probability value) equals $$H(\text{second probability value}) - H(\text{fourth probability value}),$$

where H is a Shannon entropy.

20. The system of claim 17, wherein the first computer-executable instructions to determine the distance loss include calculating:

average($\|e(x)-c\|^2 \text{sign}(x)$), where x is the first embedding vector and sign(x) is: 1 if the class label of the image is indicative of the first class, or −1 if the class label of the image is indicative of the second class, and c is an embedding vector reference parameter having a same dimension as the first embedding vector.

* * * * *

UNITED STATES PATENT AND TRADEMARK OFFICE
CERTIFICATE OF CORRECTION

PATENT NO. : 11,804,060 B1
APPLICATION NO. : 17/443365
DATED : October 31, 2023
INVENTOR(S) : Rui Zhao et al.

It is certified that error appears in the above-identified patent and that said Letters Patent is hereby corrected as shown below:

On the Title Page

Item (56) References Cited:
U.S. Patent Pub. No. 2017/0039357 ("Hwang") is missing
U.S. Patent Pub. No. 2017/0039375 ("CENTONZE") should be removed In the Claims Column 16, Claim 3, Line 57:
Currently reads: average ( log(first probability value) - average ( log(third
When it should read: - average ( log(first probability value) - average ( log(third Column 18, Claim 10, Line 5:
Currently reads: average ( log(first probability value) - average ( log(third
When it should read: - average ( log(first probability value) - average ( log(third Column 20, Claim 18, Line 6:
Currently reads: average ( log(first probability value) - average ( log(third
When it should read: - average ( log(first probability value) - average ( log(third Signed and Sealed this
Twelfth Day of December, 2023

Katherine Kelly Vidal
*Director of the United States Patent and Trademark Office*